(12) United States Patent
Rownin

(10) Patent No.: US 9,319,845 B1
(45) Date of Patent: Apr. 19, 2016

(54) MOBILE DEVICE LOCK-OUT SYSTEM

(71) Applicant: Scott D. Rownin, Westport, CT (US)

(72) Inventor: Scott D. Rownin, Westport, CT (US)

( * ) Notice: Subject to any disclaimer, the term of this patent is extended or adjusted under 35 U.S.C. 154(b) by 407 days.

(21) Appl. No.: 13/870,397

(22) Filed: Apr. 25, 2013

Related U.S. Application Data

(60) Provisional application No. 61/637,952, filed on Apr. 25, 2012.

(51) Int. Cl.
*H04W 4/04* (2009.01)

(52) U.S. Cl.
CPC .................... *H04W 4/046* (2013.01)

(58) Field of Classification Search
CPC .................................... H04W 4/046
USPC ......... 455/456.4, 569.1–569.2, 418–420, 441
See application file for complete search history.

(56) References Cited

U.S. PATENT DOCUMENTS

| 6,973,333 | B1 * | 12/2005 | O'Neil | H04W 4/046 340/425.5 |
|---|---|---|---|---|
| 8,706,143 | B1 | 4/2014 | Elias | |
| 8,880,107 | B2 | 11/2014 | Movsesyan et al. | |
| 2007/0072553 | A1 * | 3/2007 | Barbera | 455/67.11 |
| 2011/0009107 | A1 * | 1/2011 | Guba | G08G 1/20 455/418 |
| 2011/0195699 | A1 * | 8/2011 | Tadayon | H04B 5/0062 455/418 |
| 2013/0303143 | A1 * | 11/2013 | Schrader | H04M 1/72577 455/418 |
| 2014/0256303 | A1 * | 9/2014 | Jones | H04W 4/027 455/418 |
| 2015/0319608 | A1 * | 11/2015 | Varughese | H04W 4/046 455/456.4 |

\* cited by examiner

*Primary Examiner* — Sharad Rampuria
(74) *Attorney, Agent, or Firm* — Tyson B. Benson; Advent, LLP

(57) ABSTRACT

A mobile electronic device that is operable to at least partially disable functionality of the mobile electronic device in response to receiving an indication that a vehicle is in motion. In one or more implementations, the electronic device includes a memory operable to store one or more modules and a processor communicatively coupled to the touch-sensitive display and to the memory. The processor is operable to execute the one or more modules to detect presence of a lock-out device and to receive an indication that a vehicle is in motion. The processor is also operable to execute the one or more modules to cause the mobile electronic device to be at least partially inoperable in response to receiving the indication and detecting presence of the lock-out device.

10 Claims, 2 Drawing Sheets

MOBILE DEVICE LOCK-OUT SYSTEM

CROSS-REFERENCE TO RELATED APPLICATIONS

The present application claims the benefit under 35 U.S.C. §119(e) of U.S. Provisional Application Ser. No. 61/637,952, entitled MOBILE DEVICE LOCK-OUT SYSTEM, filed on Apr. 25, 2012. U.S. Provisional Application Ser. No. 61/637, 952 are herein incorporated by reference in its entirety.

BACKGROUND

Use of mobile devices, such as cell phones, while driving can be exceptionally distracting and dangerous, even if only done occasionally. Unfortunately, some drivers still use such devices when driving. Younger drivers may be particularly prone to using their mobile devices inappropriately while driving.

SUMMARY

A mobile electronic device that is operable to at least partially disable functionality of the mobile electronic device in response to receiving an indication that a vehicle is in motion. In one or more implementations, the electronic device includes a memory operable to store one or more modules and a processor communicatively coupled to the touch-sensitive display and to the memory. The processor is operable to execute the one or more modules to detect presence of a lock-out device and to receive an indication that a vehicle is in motion. The processor is also operable to execute the one or more modules to cause the mobile electronic device to be at least partially inoperable in response to receiving the indication and detecting presence of the lock-out device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The detailed description is described with reference to the accompanying figures. The use of the same reference numbers in different instances in the description and the figures may indicate similar or identical items.

DETAILED DESCRIPTION

Figure 1:
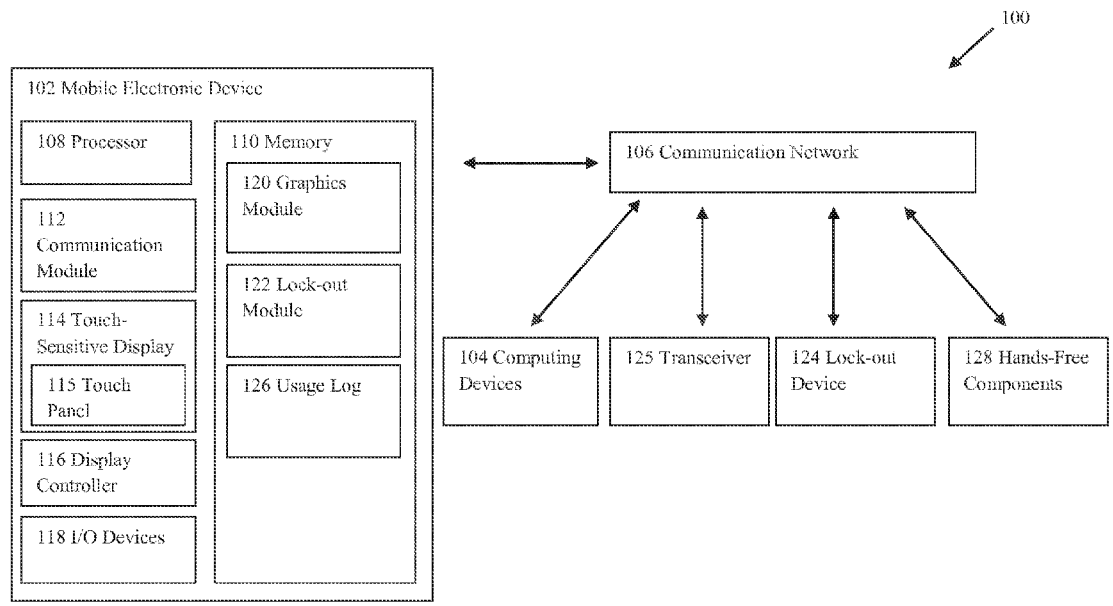
FIG. 1 is a block diagram of a system that includes a mobile electronic device in accordance with an example implementation of the present disclosure.

FIG. 1 illustrates an example lock-out system 100 in an example implementation that is operable to cause a mobile electronic device 102 to be at least partially disabled when the device 102 detects a vehicle is in motion and the device 102 has discovered and/or paired with a lock-out device 124 (e.g., communicatively coupled, detects that the lock-out device 124 has powered on and is discoverable). The system 100 includes a mobile electronic device 102 configured to communicate with one or more other devices 104 (e.g., computing devices, such as servers, mobile electronic devices, etc.) over a communication network 106. The electronic device 102 may comprise a mobile computing device (e.g., a smartphone device, a tablet computing device, etc.), or the like.

The electronic device 102 includes a processor 108 and a memory 110. The processor 108 provides processing functionality for the electronic device 102 and may include any number of processors, micro-controllers, or other processing systems and resident or external memory for storing data and other information accessed or generated by the device 102. The processor 108 may execute one or more software programs (e.g., modules) that implement techniques described herein.

The memory 110 is an example of tangible computer-readable media that provides storage functionality to store various data associated with the operation of the electronic device 102, such as the software program and code segments mentioned above, or other data to instruct the processor 108 and other elements of the electronic device 102 to perform the steps described herein. Although a single memory 110 is shown, a wide variety of types and combinations of memory may be employed. The memory 110 may be integral with the processor 108, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth. In embodiments of the device 102, the memory 110 may include removable ICC (Integrated Circuit Card) memory such as provided by SIM (Subscriber Identity Module) cards, USIM (Universal Subscriber Identity Module) cards, UICC (Universal Integrated Circuit Cards), and so on.

The electronic device 102 is communicatively coupled to other computing devices 104 over a communication network 106 through a communication module 112 included in the device 102. The communication module 112 may be representative of a variety of communication components and functionality, including, but not limited to: one or more antennas; a browser; a transceiver and/or receiver; a wireless radio; data ports; software interfaces and drivers; networking interfaces; data processing components; and so forth. For example, the communication module 112 may represent radio frequency (RF) circuitry configured to receive and/or transmit electromagnetic signals. The RF circuitry is also configured to convert electrical signals to/from electromagnetic signals and communicates with the communications network 106 and other communications devices via the electromagnetic signals. RF circuitry may include, but is not limited to: an antenna system, an RF transceiver, one or more amplifiers, a tuner, one or more oscillators, a digital signal processor, a CODEC chipset, a subscriber identity module (SIM) card, memory, and so forth. In some implementations, the processor 110, the memory 112, and the graphics module 120 (described herein) may include suitable hardware to comprise a communications module 112.

The communication module 112 facilitates communication with other devices (e.g., electronic mobile devices, web servers, web clients, the communication device 104, desktop computers, laptop computers, etc.) through the communication network 106, external ports (e.g., Universal Serial Bus (USB), a FIREWIRE communication interface, etc.) included in the electronic device 102, or the like. The external ports are adapted for communicatively coupling the device 102 directly to other devices or indirectly over the communication network 106. In some embodiments, the external port is a multi-pin connector, or the like.

The communication network 106 may comprise a variety of different types of networks and connections that are contemplated, including, but not limited to: the Internet; an intranet; a satellite network; a cellular network; a mobile data network; wired and/or wireless connections; and so forth.

Wireless networks may comprise any of a plurality of communications standards, protocols and technologies, including but not limited to: Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11 g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS), and/or Short Message Service (SMS), near field communication (NFC), or any other suitable communication protocol.

As shown in FIG. 1, the electronic device 102 may include a touch-sensitive display 114, which can be implemented using a liquid crystal display, an organic light emitting diode display, or the like. In some embodiments, the touch-sensitive display 114 may include a touch panel 115. The touch panel 115 may be, but is not limited to: a capacitive touch panel, a resistive touch panel, an infrared touch panel, combinations thereof, and the like. Thus, the display 114 may be configured to receive input from a user and display information to the user of the electronic device 102. For example, the display 114 displays visual output to the user. The visual output may include graphics, text, icons, video, and any combination thereof (collectively termed "graphics"). In some embodiments, some or all of the visual output may correspond to user-interface objects, further details of which are described below.

The display 114 is communicatively coupled to a display controller 116 that is configured to receive and/or transmit electrical signals to the touch-sensitive display 114. In an implementation, the touch panel 115 includes a sensor, an array of sensors, or the like, configured to accept input from a user based upon haptic and/or tactile contact. The touch panel 115, in combination with the display controller 116 (along with any associated modules and/or sets of computer-readable instructions in memory 110), detects a point of contact (or points of contact), as well as any movement or breaking of the contact, on the touch panel 115 and converts the detected contact (e.g., a finger of the user, a stylus, etc.) into electrical signals representing interactions with user-interface objects (e.g., buttons, custom views, icons, web pages, images, web page links, etc.) that are displayed through the display 114.

The electronic device 102 may further include one or more input/output (I/O) devices 118 (e.g., a keypad, buttons, a wireless input device, a thumbwheel input device, a trackstick input device, and so on). The I/O devices 118 may include one or more audio I/O devices, such as a microphone, speakers, and so on.

The electronic device 102 also includes a graphics module 120 configured to render and display graphics through the display 114. In an implementation, the graphics module 120 may be dedicated hardware configured to render and display graphics through the display 114. In another implementation, the graphics module 120 is representative of computer executable instructions stored in memory 110 and executable by the processor 108, which is configured to cause the processor 108 to initiate rendering and displaying of graphics through the display 114. Thus, the module 120 is capable of changing the intensity of graphics that are displayed. As used herein, the term "graphics" includes any object that can be displayed to a user, including without limitation text, web pages, icons (such as user-interface objects including soft keys), digital images, videos, animations and the like. In an implementation, the graphics module 120 is configured to render and display graphics representing the magnitude of an input signal versus a range of frequencies.

As shown in FIG. 1, the electronic device 102 includes a lock-out module 122, which is storable in the memory 110 and executable by the processor 108. The lock-out module 122 is representative of functionality to at least partially disable functionality of the device 102. The module 122 is configured to automatically disable the device 102 by preventing the device from being used to text, make or receive calls, or allow for any other physically interaction with the device, and also preventing the device from generating any audible and/or visual alerts while a vehicle is in motion. For example, the module 122 is configured to prevent the processor 108 from recognizing input received through the I/O devices 118 and/or the touch panel 115. In an implementation, the module 122 is configured to at least partially disable operation of the device 102 when the device 102 detects that the device 102 is in motion and the device 102 detects the presence (e.g., discovers, communicatively couples, etc.) of the lock-out device 124.

In an implementation, the lock-out device 124 and the module 122, in combination may effectively disable a mobile device's call and text capabilities while driving. For example, the module 122 may be configured to instruct the processor 108 to disable the touch panel 115 (e.g., a screen lock) to at least substantially eliminate the visual distraction of a mobile device. The module 122 may also be configured to instruct the processor 108 to disable (e.g., silence) audible alerts generated by the mobile electronic device 102.

The motion of the vehicle may be detected by the mobile device 102 or by the lock-out device 124 (e.g., an accelerometer in the mobile device, a GPS receiver receiving positional data from a GPS system, or through the network-based location data). In such embodiments, the GPS system may be used to detect motion of the mobile device while on a road. The motion may also be detected through use of the mobile devices wireless network, such as by network triangulation, detecting a change of distance to the mobile tower through which the mobile device is connecting to the network, or other processes utilizing the network for detecting motion. When such motion is detected, the mobile device may transmit a signal to determine if it is in a vehicle in which a paired lock-out system is placed. If the lock-out device signal is detected, the lock-out system 100 is activated.

In some embodiments, the device 102 discovers (i.e., detects the presence of via Bluetooth discoverable mode) or communicatively couples to the lock-out device 124, The device 102 is configured for detecting when the vehicle is in motion and comprises a wireless transceiver 125 (e.g., Bluetooth transceiver, Wi-Fi transceiver, near field communication (NFC) transceiver, or any other suitable wireless system) capable of being communicatively coupled with the lock-out device 124. For example, the device 102 may detect that the vehicle is in motion when the device 102 determines the device 102 is moving and the device 102 detects the presence of the lock-out device 124.

In some embodiments, the mobile device 102 may detect that the device 102 is in motion and also detect that it is in close proximity to the lock-out device 124, which would also cause the module 122 to lock out one or more functionalities of the mobile device 102. Other devices for detecting motion may include the use of the mobile device's internal GPS capabilities and/or the use of location data from the cellular and/or data network. In some embodiments, the use of the GPS capabilities or network connection to detect motion may be used in combination with mapping software to determine if the position of the mobile device is consistent with motion on a roadway.

In some implementations, module 122 is configured to at least substantially prevent access (i.e., lock-out) to one or more functionalities of the mobile device 102 when the lock-out device 124 sends a signal indicating that the vehicle is in motion.

Within the lock-out device 124, an accelerometer, GPS receiver, a gyroscope, network-based data, or other available location data, may be combined with a Bluetooth transceiver, a NFC transceiver, or a Wi-Fi transceiver, to transmit a signal to the mobile device 102 when a vehicle is moving. Once the signal is detected by the mobile device 102, the module 122 is configured to lock the screen and mute the audio of the mobile device 102. In another implementation, when the mobile device 102 detects that the device 102 is in motion by way of an accelerometer, GPS receiver, a gyroscope, network-based data, or other available location data and in close proximity to the lock-out device 124, the module 122 is configured to lock the screen and mute the audio of the mobile device 102. In other words, the lock-out system 100 removes the visual and audible distraction of a mobile device while driving. Other features may be incorporated such as the ability to pass through voice commands and provide for the continued use of hands-free devices, the ability to make emergency calls, as well as password-protected administration and "passenger-mode" discussed herein.

In some embodiments, the lock-out system 100 includes a Bluetooth "beacon" (e.g., signal) that is transmitted when a vehicle is in motion. The beacon is then received by the module 122.

The lock-out device 124 may be a combination of an accelerometer, or other device for detecting motion in the car (e.g., GPS receiver), with a Bluetooth transceiver or other wireless transceivers, to furnish an indication to the module 122 that a vehicle is in motion, and a rechargeable battery.

In some embodiments, the lock-out device 124 may be designed to receive power from a twelve volt power source (e.g., a car battery). Further, a pass-through USB port may be furnished to allow for charging of the device 102 or any other device requiring a charge without removing the lock-out device from the 12V receptacle.

The lock-out device may be powered by a rechargeable battery. The battery may be recharged via a mini-USB slot, or other suitable power port. A twelve volt car-adapter charger may be provided. Two small LEDs may be incorporated into the lock-out device 124 to give visual signals to a user. One of the LEDs may be used to signal when the lock-out device is active, while the other may be a 3-stage light (green for sufficient power, red for low power, blinking red for urgent low power). The lock-out device 124 may also transmit a low-power alert when the battery has run down to having only approximately 10-20% of its power remaining. In some embodiments, the lock-out device 124 may require a twelve volt power source, to allow for use in a car via the 12V receptacle.

In some embodiments, the design may be tamper-proof, and provide a mini-USB, or other similar port for charging an internal (non-removable) battery. This port may also be used to connect the lock-out device to a computer for the purposes of administration or diagnostics.

One particular embodiment of the lock-out system 100 may include a relatively small, discreet lock-out device. The housing of the lock-out system 100 should be tamper-proof (i.e., there should be no way to open the lock-out device housing, by a user, without permanently altering the lock-out device).

In some embodiments, a spring-loaded switch may be positioned on the bottom or side of the lock-out device 124, which would be depressed when mounted or installed, and then released if the lock-out device were to be removed, sending an additional alert signal to the module 122 and/or an administrator (email/text notification may be generated in the application), alerting that lock-out device has been removed.

Multiple, semi-permanent mounting options may be provided. In an implementation, the lock-out device 124 is mounted such that the lock-out device 124 is stable and does not at least substantially shift during normal use, but can be removed for use in another car without damage to the lock-out device 124 or the vehicle.

In addition to the Bluetooth alert (e.g., signal, or "beacon") that the vehicle is in motion, the lock-out device may also alert the application (via Bluetooth, or other chosen wireless communication protocol) when the power is low enough to require a charge (within approximately 10-20% of remaining battery life) as well as if the lock-out device has been removed. The latter should be accomplished via a spring-loaded switch on the underside of the lock-out device or a "hall-effects" switch (an internal magnetic switch). When mounted, the spring may be compressed (or the magnet may be engaged). If the lock-out device were to be removed, the spring would expand (magnet is released), and as a result the lock-out device transmits a signal to the module 122 to alert of the condition.

The lock-out device may also send an alert to the mobile device once power has been fully restored, letting the user know the lock-out device 124 can be removed from the charger.

The module 122 may also record each successful attempt to detect the proximity of the lock-out device 124 in a Usage Log 126. The Usage Log 126 may be based on custom Monitors, tailored to detect use based on a specific individual's expected behavior. The administrative settings within the module 122 may provide the ability to export this Usage Log 126 automatically to a designated email or text address, with a designated frequency. This functionality is primarily designed for insurance company partnerships, where it would be necessary to prove the device is in use. It may also be used to subvert the attempt of the user to disable the switch used to detect removal and/or any other attempt to disable the system 100 by providing confirmation of use. Similarly, the Usage Log 126 could be used to prove that the lock-out system has not been used.

The Bluetooth beacon may include a unique identifier assigned to the lock-out device 124, such as the MAC address, to facilitate pairing. For example, the unique identifier may prevent a lock-out device 124 in a neighboring car from activating the module 122 of the wrong mobile device 102. The unique identifier (e.g., MAC address) may also be used to validate that the lock-out device is genuine by comparing against a database of known devices. In some embodiments, validation may be accomplished via a specific, cipher-based, call and response between the lock-out device 124 and the module 122. The module 122 may provide a facility to pair each lock-out device 124 with multiple mobile devices 102, and multiple lock-out devices 124 with each mobile device 102, so a family could have a lock-out device in each car, with all of their mobile devices working with each lock-out device.

In embodiments utilizing Bluetooth or Wi-Fi devices, pairing may be accomplished using MAC addresses.

Allowable functions that may be accessed when the lock screen is active include Emergency Dial. This could be done by the module 122 detecting a finger swipe in the shape of a "9" being performed at the touch panel 115.

The Emergency Dial Screen appears if a "9" swipe is detected at the touch-panel 115 during the Lock Screen mode of operation. If the user subsequently enters two consecutive vertical swipes (similar to the number "1") the mobile device 102 is configured to automatically dial 911. If anything else is entered, the user may be prompted if an emergency call is required and reminded of the correct pattern to execute the emergency call. In some embodiments, the initial '9' swipe automatically causes the device 102 to dial 911 if the action is not cancelled within a designated amount of time. For example, the device 102 may provide an audible count down automatically and place the device 102 in speakerphone mode upon calling 911.

The above emergency functionality may also be accessed from any screen, at any time, offering a separate Emergency Dial Application for the mobile device 102.

A horizontal scroll list, or similar "Dock," at the bottom of the screen may be loaded with the application icons for applications specified in Approved Apps Settings. A Passenger Mode button may be present in the bottom half of the panel 115. In some embodiments, this Passenger Mode button may be integrated into the Lock Screen graphics, rather than being a separate button. If pressed, the user may be prompted with Passenger Mode Password Pop-up, to enter a password and deactivate the lock screen temporarily, until the lock-out system 100 has been disengaged. In some embodiments, the audio may still remain muted in Passenger Mode. Normal functionality of the device 102 may be restored until the next time the lock-out system 100 is engaged.

When any of the pre-determined Approved Apps (such as navigation or voice dialing) are selected, it may go directly into the selected application, but the Home button may remain disabled. The Back Button, or any other processes for exiting a pre-determined Approved Apps, may revert to the Lock Screen. In some embodiments, when the user is within an Approved App and the I/O devices 118 cannot be fully disabled, then exiting the Approved App automatically locks the screen again.

When the Passenger Mode Button is pressed, a pop-up screen/dialog box is presented, prompting the user to enter the Passenger Mode Password. If the password is entered correctly, the screen is configured to unlock and the mobile device 102 reverts to normal mode (in some implementations maintaining the silent mode of operation). If the password is entered incorrectly, the Lock Screen may reappear. After a predetermined number of failed attempts, the Lock Screen may be presented, absent the Passenger Mode button or ability to enter Passenger Mode. The Passenger Mode Button may reappear, or other processes for entering Passenger Mode may become active again, each time the Lock Screen is called automatically from a new Bluetooth signal, or each time the lock-out system is otherwise engaged.

In additional embodiments, the lock-out device 124 may include a button to activate a Concierge service. In such embodiments, the button enables the mobile electronic device 102 in speakerphone mode, and automatically dials a pre-defined Concierge number. In such embodiments, this functionality can provide for distinguishing between a road-side service request and an information-based concierge call.

In some embodiments, the module 122 may lock out the mobile device's 102 ability to place and receive both text messages and calls while the driver's car is in motion. The module 122 may include a variety of preferences such that an administrator, such as a parent of a young driver, a manager of a delivery driver or other corporate employee, or some other person, can select the functionalities that may be locked out, or conversely, which functionalities may be allowed. These may include the ability to send and/or receive text messages, emails, application notifications, phone calls, or other forms of communication. The module 122 may be configured to allow only voice dialing, or emergency calls. Certain applications available through the mobile device 102 may be allowed to function when the vehicle is in motion. These applications may include navigation applications, or other applications, that are useful for driving but may not be considered overly distracting.

An example application may include a number of screens through which the user or administrator can interact with the module 122. A lock screen may be presented at the touch panel 115, and the lock screen cannot be accessed manually. The presence of the unique Bluetooth signal along with motion being detected activates this screen. In some embodiments, when this screen is activated, one or more hardware buttons are disabled, the module 122 causes the device 102 to enter a silent mode of operation (e.g., no audible alerts via the I/O devices 118), the touch panel 115 is disabled, except for the allowable functions, and after a set period of time, the module 122 causes the panel 115 to be blank.

An Administrative Screen is accessible via the application icon in the application list. Upon entry, the user is prompted to enter the Administrative Password. The first time the module 122 is used, the Administrative Password is set. All administrative changes may require re-entry of the Administrative Password for the changes to take effect. The initial screen may provide access to each of the following functions/pages:

Pairing of Lock-Out Devices/Purchase Hardware (Hardware Setup)

This screen allows the user to pair with an unlimited number of lock-out devices (possibly by entering a unique serial number for each, a MAC address for each, or some other identifier used to pair to a mobile device). This may also be accomplished via a "pairing" button on the lock-out device in coordination with the discoverable mode of a Bluetooth transceiver. This may also be accomplished by having the Lock-out Device remain permanently in "Discoverable" mode and having the application subsequently discover the Lock-out device. In some embodiments, this request for pairing may be validated by either PIN, or a programmed cipher in the call and response between the Lock-out device and the application. This pairing may then dictate which unique lock-out devices/signals the application responds to. There may also be a link on the screen to a website for information on purchasing additional hardware.

Admin Contact Settings

This screen allows the user to enter multiple emails or cell phone numbers (for text alerts). The system may also allow for the selection of which alerts go to each address. For example, a parent's email address may get all alerts, while the teenager may be copied on the alert that power is low.

Approved Apps Settings

This screen may allow the user to select which applications appear in the horizontal scroll on the Lock Screen. A note about allowing applications that do not offer a distraction may be present. An additional suggestion for which applications are appropriate could be included (GPS, Navigation, voice dialing, etc.)

Password Setting/Change

This screen allows for two separate passwords to be set or changed. A user can change the Administrator Password— this would require the user to enter the existing password to effect the change. A user may also set or change the Passenger Mode Password—this password can be set separately so it can be entered in front of a restricted user without concern for compromising the security of the remainder of the application. There should also be an option to sync this with the Administrative Password if the user does not need them to be different.

Alert Preferences

This screen may allow the user to choose which alerts are active and how the alerts are applied. The available alerts are low-power, removal of device, Bluetooth (or Wi-Fi) being disabled on the mobile device, monitor of use (Usage Log— to send updates to insurance companies or another specified administrator when the device is active), and charge restored alert. Also, an alert may be included for the event of a manual disablement of the Lock Screen for iOS, or other operating systems in which a Lock Screen cannot be forced to remain active. One or more alerts may be created based upon custom monitors that are based upon the intended user's expected behavior.

Force Bluetooth/Wi-Fi/GPS/Network-based location data Settings

This screen may allow the user to set whether, and how often the, application causes the Bluetooth to power on. This is meant to subvert the attempt to disable the functionality by turning Bluetooth/Wi-Fi/GPS/Network-based location data off.

In some embodiments, where the lock-out device 124 does not contain internal GPS, if GPS has been disabled on the phone, the lock-screen may be automatically presented when the lock-out device 124 is detected, prompting the user to enable GPS for proper functionality. This screen may allow the user to modify times at which (e.g., early morning, etc.) and/or the frequency with which the module 122 checks the presence of the device 124 or motion of the device 124 and/or powers on the Bluetooth device, accelerometer, GPS receiver, etc.

Uninstall Lock

This screen may allow the user to prevent the un-installation of the application without first entering the administrative password. In some cases, if un-installation cannot be prevented, the module 122 may allow for installations on various phones to be grouped, such that an administrator's installation can be set to look for the presence of a subordinate installation. If this presence is not detected, an alert can be generated to the administrator, notifying them that the subordinate installation is not functioning properly.

Usage Log Setting

This screen may allow the user to access the Usage Log, and manually export the data and/or send this data file to an email or text address.

In addition to the various screens needed for a user to interact with the application, alerts are also provided. These alerts are sent when a signal is received from the lock-out device. The application is not open, but rather called in the background to determine whether or not to send an alert, and to what address(es) or phone numbers. Examples of alerts that may be useful include, but are not limited to: alerts for Low-Power, Removal of Device, Bluetooth/Wi-Fi/GPS/Network-based Location Data being disabled on the mobile device, and Charge Restored.

In other embodiments, the lock-out system may be provided as a built-in accessory for a vehicle. In such embodiments, the lock-out system 100 may be configured to send the lock-out signal when the vehicle's transmission is not in park, or some other process for differentiating between parking and driving. The lock-out system 100 may also then be powered by the vehicle's electrical system.

In other embodiments, the lock-out system may be integrated into existing in-car accessories, such as stand-alone GPS systems, or other similar devices.

In an additional embodiment where the mobile device 102 has sufficient functionality, the module 122 of the mobile device 102 may lock the mobile device without the use of an additional lock-out device. When the mobile device detects motion on a road, by GPS in combination with mapping software for example, the module 122 may cause the mobile device 102 to enter a lock-out mode of operation. However, such a configuration would not be tailored to work in a specific vehicle having a paired lock-out system.

As shown in FIG. 1, the device 102 is configured to communicatively couple to one or more hands-free components 128 (e.g., technology that interfaces with the device 102 to cause the device 102 to perform desired functionality based upon receiving voice commands). In this implementation, the device 102 may still be operable to perform various functionality, such as calling, texting, setting reminders, and so forth, when utilized through the hands-free components 128.

Figure 2:
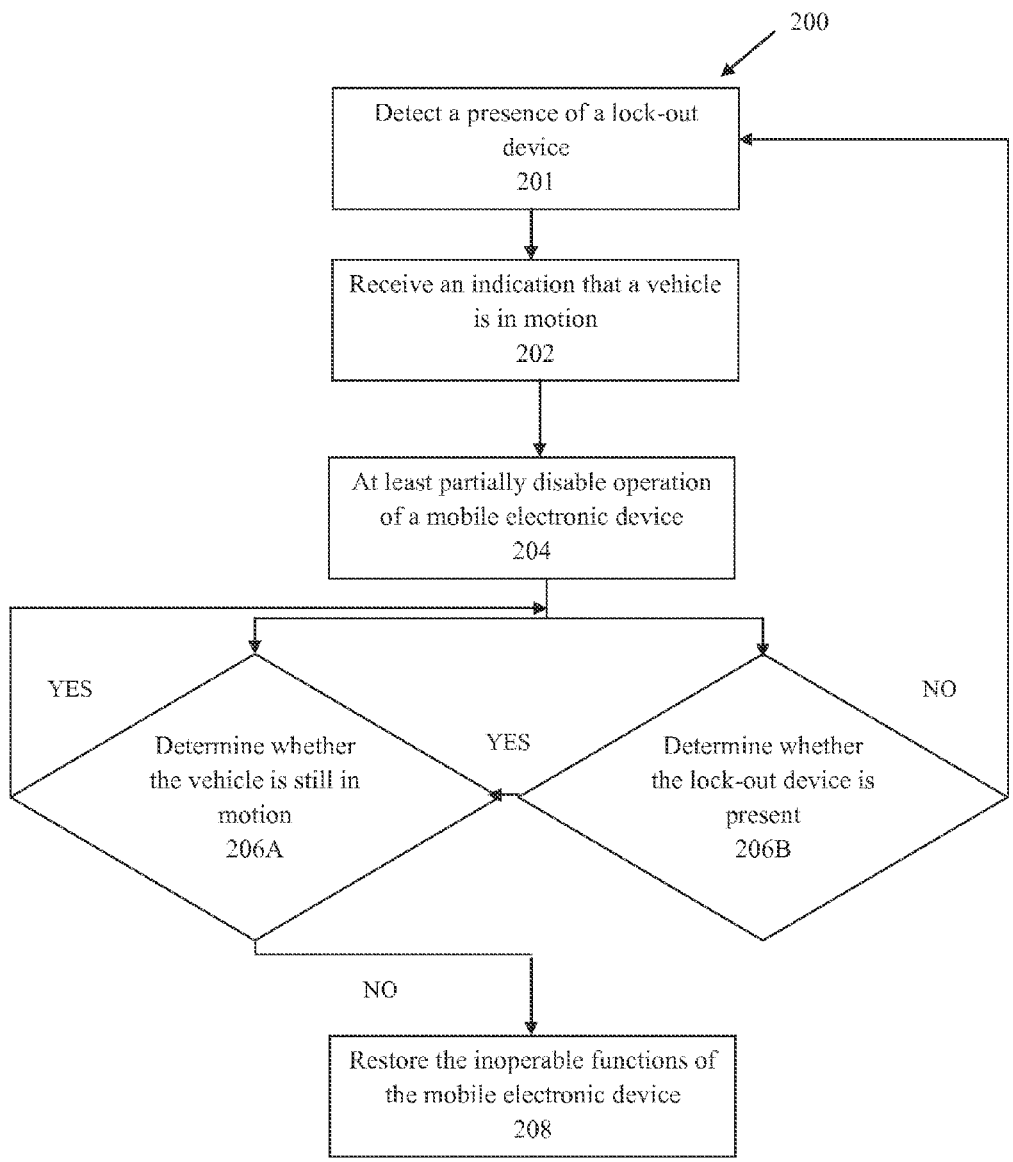
FIG. 2 illustrates an example flow diagram for at least partially disabling functionality of a mobile electronic device while a vehicle is in motion.

FIG. 2 illustrates an example method 200 for at least partially disabling functionality of a mobile electronic device 102 in accordance with the present disclosure. As shown in FIG. 2, presence of a lock-out device is detected (Block 201). As described above, the device 102 is configured to detect the presence of a lock-out device 124. For example, the device 102 may receive a Bluetooth signal indicating the presence of the lock-out device 124. In some implementations, the device 102 is configured to pair, or communicatively couple, to the lock-out device 124. In other implementations, the device 102 is configured to discover, or detect the presence, of the lock-out device 124. An indication is received representing that a vehicle is in motion (Block 202). As described above, the module 122 is configured to continually determine whether the vehicle is still in motion based upon the received signals from the lock-out device 124 or based upon internal location-determining components, indicating that a vehicle that includes the device 102 is in motion. In response to receiving the indication, functionality of a mobile electronic device is at least partially disabled (Block 204). For example, the module 122 is configured to cause a first set of mobile electronic device functions (e.g., visual output, audible output, etc.) to be at least substantially inoperable and a second set of mobile electronic device functions (e.g., receiving an indication that the user wishes to utilize the device for telephonic communication, etc.) to remain operable.

As shown in FIG. 2, a determination is made of whether the vehicle is still in motion (Decision Block 206A). The module 122 is configured to continually determine whether the vehicle is still in motion based upon the received signals from the lock-out device 124 or based upon internal location-determining components. When the vehicle is no longer determined to be in motion (NO from Decision Block 206A), the inoperable functions of the mobile electronic device are restored (Block 208). For example, the module 122 is configured to cause the processor 108 to restore the inoperable functionality when a signal is received indicating that the vehicle is no longer in motion. If the vehicle is determined to still be in motion (YES from Decision Block 206A), the module 122 is configured to cause the processor 108 to continually determine whether the vehicle is still in motion based upon the received signals from the lock-out device 124 or based upon internal location-determining components.

As shown in FIG. 2, a determination is made of whether the lock-out device is still present (e.g., detected) (Decision Block 206B). The module 122 is configured to continually determine whether the lock-out device 124 is detected. For example, the module 122 is configured to cause the device 102 to detect the presence of the lock-out device 124 at predetermined intervals. If the lock-out device is not present (e.g., not detected) (NO from Decision Block 206B), the method 200 returns to Block 201. If the lock-out device is still present (YES from Decision Block 206A), the method 200 moves to Decision Block 206A to determine whether the vehicle is still in motion.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims. A person skilled in the art will recognize that portions of the present disclosure may be implemented in hardware, software, firmware, combinations thereof, and so forth.

What is claimed is:

1. A lock-out system comprising:
   a lock-out device coupled to a vehicle and a mobile electronic device independent of the lock-out device, the mobile electronic device comprising:
   a memory operable to store one or more modules;
   a processor communicatively coupled to the memory, the processor operable to execute the one or more modules to:
   detect a presence of the lock-out device, wherein said detection is limited to only detecting presence of the lock-out device;
   determine that the vehicle is in motion at a location-determining component of the mobile electronic device, the vehicle including the mobile electronic device;
   in response to detecting the presence of the lock-out device and then determining that the vehicle is in motion, cause the mobile electronic device to be at least partially inoperable.

2. The lock-out system as recited in claim 1, wherein the mobile electronic device further comprises at least one of a touch-sensitive display or an I/O device, the at least one of a touch-sensitive display or an I/O device configured to receive one or more inputs, wherein the processor is operable to execute the one or more modules to cause the at least one of a touch-sensitive display or an I/O device to be at least partially inoperable by preventing the processor from recognizing input from the at least one of a touch-sensitive display or an I/O device in response to detecting the presence of the lock-out device and determining that the vehicle is in motion.

3. The lock-out system as recited in claim 1, further comprising at least one of an accelerometer or a global positioning system receiver, wherein the processor is operable to execute the one or more modules to determine whether the mobile electronic device is moving.

4. The lock-out system as recited in claim 1, wherein the lock-out device comprises at least one of an accelerometer or a global positioning system receiver.

5. The lock-out system as recited in claim 1, wherein determining that the vehicle is in motion includes an indication that is transmitted by a transceiver, the transceiver communicatively coupled to the lock-out device.

6. The lock-out system as recited in claim 5, wherein the transceiver comprises at least one of a Bluetooth transceiver, a near field communication transceiver, or a Wi-Fi transceiver.

7. The lock-out system as recited in claim 5, wherein the processor is operable to execute the one or more modules to cause the mobile electronic device to be at least partially inoperable when the indication includes a unique identifier assigned to the lock-out device.

8. A method comprising:
   detecting, at a mobile electronic device, a presence of a lock-out device coupled to a vehicle, the mobile electronic device independent from the lock-out device, wherein said detection is limited to only detecting presence of the lock-out device;
   determining at the mobile electronic device that a location determining component of the mobile electronic device is disabled;
   at least partially disabling functionality of the mobile electronic device in response to detecting the presence of the lock-out device and then determining that the location determining component is disabled;
   determining at least one of whether the location determining component is disabled or that the lock-out device remains present; and
   restoring the disabled functionality when the location determining component is no longer disabled or the lock-out device is no longer detected to be present.

9. The method as recited in claim 8, wherein the lock-out device comprises at least one of an accelerometer or a global positioning system receiver.

10. The method as recited in claim 8, wherein at least partially disabling functionality of the mobile electronic device in response to detecting the presence of the lock-out device and then determining that the location determining component has been disabled further comprises at least partially disabling recognition of inputs from at least one of a touch-sensitive display or an I/O device of the mobile electronic device.

* * * * *